C. L. STOKES.
FLOAT FEED CHAMBER AND SUPPLY SYSTEM THEREFOR.
APPLICATION FILED JULY 10, 1917.
1,303,610.
Patented May 13, 1919.
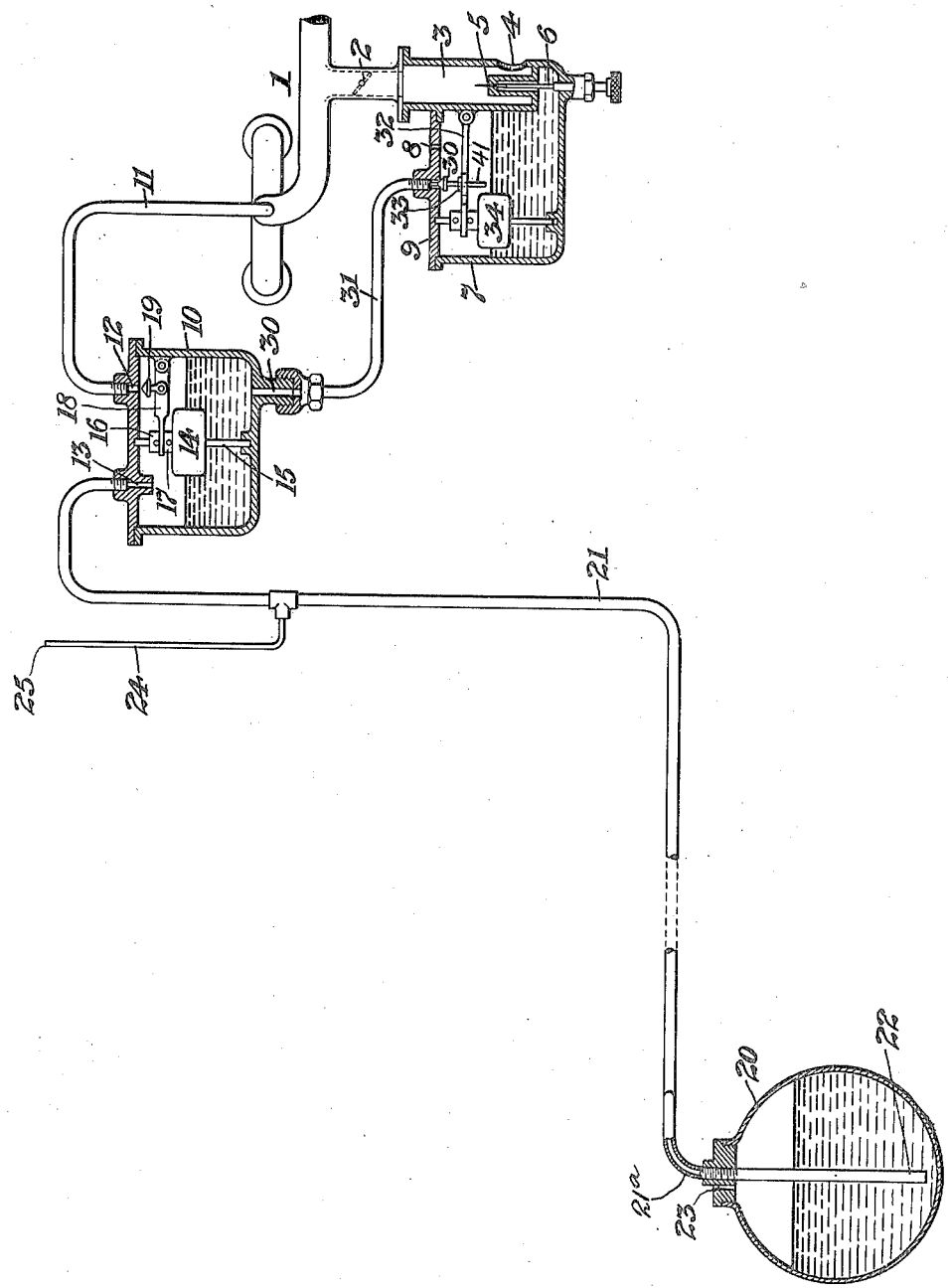

UNITED STATES PATENT OFFICE.

CHARLES LAWRENCE STOKES, OF LOS ANGELES, CALIFORNIA.

FLOAT FEED-CHAMBER AND SUPPLY SYSTEM THEREFOR.

1,303,610.           Specification of Letters Patent.      Patented May 13, 1919.

Application filed July 10, 1917. Serial No. 179,622.

*To all whom it may concern:*

Be it known that I, CHARLES LAWRENCE STOKES, a citizen of the United States, and resident of Los Angeles, in the county of Los Angeles and State of California, have invented certain new and useful Improvements in Float Feed-Chambers and Supply Systems Therefor, of which the following is a specification.

My present invention relates to liquid feed systems of the type in which oil, gasolene, kerosene or similar liquid is maintained at an approximately constant level and under approximately constant pressure, preferably atmospheric, in a so-called float chamber from which the liquid is drawn for the desired use, as for instance, to a carbureter fuel jet or to a circulatory lubricating system.

It relates particularly to systems in which the float chamber is fed from a supply tank at a lower level by means and under conditions in which the pressure tending to feed the liquid toward the float chamber reverses either accidentally or from regular operation of the system.

My invention consists broadly in the combination with such a system, of a float chamber in which the float operated valve controlling the liquid inlet passage to maintain approximately constant level of the liquid therein, while under absolute control of the float for purposes of closing the inlet passage when the liquid reaches a desired predetermined level, is nevertheless free to remain closed, or if open, to automatically close independently of the float whenever the pressure in the supply passage reverses. As a result of such construction, back flow of liquid or air in the supply pipe is impossible. This eliminates the possibility of sucking either air or liquid out of the float chamber and thus avoids disturbing the constant pressure, constant level condition in the float chamber and also avoids interference with the operation of the feeding system by which the liquid is pumped from the low level supply tank.

More specifically considered, the invention consists in a carbureter having a constant level, open-to-atmosphere float chamber supply for the fuel jet equipped with the above described float closed and independently self-closing inlet valve, in combination with a vacuum supply system comprising a low level supply tank, a high level reservoir and means for applying suction to the reservoir to draw gasolene from the tank and for automatically discontinuing the suction and permitting flow of gasolene from the reservoir to the carbureter float chamber.

Such device is particularly useful in systems of the type shown in my patents of June 19th, 1917, Nos. 1,230,537, 1,230,596 and 1,230,832.

The details of the invention and its method of operation will be more fully understood from the following description thereof in connection with the accompanying drawing in which the figure shows the supply tank, reservoir and carbureter in the relative positions and in the relation to the intake manifold which they have when my invention is applied to an ordinary automobile.

The intake manifold 1, controlled by throttle valve 2 draws the carbureted air from the carbureter 3 to which it is supplied through suitable air inlet 4 in operative relation to the gasolene jet 5 controlled by the needle valve 6.

The gasolene is continuously supplied to the gasolene jet through its connection with the float chamber 7 which is continuously open to atmosphere through the breather hole 8 in the top 9 of the float chamber.

Above the level of the carbureter is the vacuum pumping reservoir 10 to the interior of which may be applied the suction available in the manifold through the pipe 11 and opening 12. The suction thus applied is utilized to draw gasolene from the low level tank 20 through the pipe 21 having its inlet opening 22 near the bottom of said tank and its outlet opening 13 in communication with the interior of the pumping reservoir. The low level tank has an air inlet 23 to maintain atmospheric pressure in the interior thereof as the level of the gasolene is lowered by the pumping.

Means is provided for admitting air to the reservoir to serve a similar purpose during the dumping periods when the suction is cut off, the means shown in the drawing being the pipe 24 communicating with the lift pipe 21, at a point below the level of the gasolene in the reservoir and having its inlet end 25 located above said level.

Within the reservoir is located the float 14, vertically slidable on the guide rod 15 and provided with suitable means such as the lugs 16, 17, for engaging the pivoted lever 18 carrying the cut off valve 19.

The float 14 operates in an obvious manner to open the valve 19 when the level of the liquid falls and to close it when the suction thus available has pumped the gasolene to its original height.

The gasolene flows by gravity through the outlet 30 and pipe 31 during the intermissions between the pumping periods as determined by the level of the liquid and the resulting movements of the float.

In the lift pipe at a point adjacent the tank is preferably arranged a restricted air inlet conventionally indicated at 21ª which is in practice of predetermined size suitable to the capacity of the apparatus whereby the suction applied from the pumping reservoir through the lift pipe 21 serves to draw a desired amount of air into the rising column of gasolene. While the provision of the air inlet to lighten the rising column of gasolene is highly desirable, it is not essential and my invention is applicable to various engine feed systems of which the above is only one type.

In ordinary carbureter feed systems, the float controlled valve of the carbureter float chamber is arranged so that it will be positively closed when the liquid level in said chamber rises to a predetermined maximum level and will be positively opened whenever the liquid falls below that level. My invention involves changing the relation of such valve to its float so that while it will be positively closed and held closed by the float at the predetermined high level of the liquid in the carbureter float chamber, it will not be positively opened nor held open by the float when that level falls, but will be free to remain closed or to close itself automatically whenever a suction condition exists in the inlet passage. Thus constructed, the carbureter float chamber will be automatically cut off from the reservoir whenever a pumping vacuum exists in that reservoir.

One way of accomplishing this is to have the valve 30 in the carbureter float chamber 7 provided with a shank 41 slidably engaging a float controlled lever 32 and formed or provided with a collar 33 whereby lifting of said lever positively closes said valve and holds it positively closed so long as the gasolene in said carbureter float chamber remains at its desired high level. When the level of the gasolene falls, and with it the float 34 and float controlled lever 32, the latter simply slides upon the smooth shank 41 of said valve. This leaves the valve free to retain its seat if there is suction on the pipe 31, and to fall if and when the suction ceases; also to close automatically if the suction comes on while the float is in the low-level position.

The operation of the above parts is as follows:

Assuming the rear tank 20 to contain a supply of gasolene, the pumping reservoir 10 and the carbureter float chamber 7 being empty and the throttle valve 2 closed. The rotation of the crank shaft of the motor by hand or electric starter, as the case may be, will create a vacuum in the manifold which will be communicated through the pipe 11 to the interior of the pumping reservoir 10, the float 14 then being in the lower position and the valve 19 open. The suction thus applied will take effect through the lift pipe 21 and the gasolene will be sucked in through the elevated reservoir in the usual manner. The suction will of course take effect also through the gravity discharge pipe 31 and the valve 30 will automatically close, so that the pumping and filling of the reservoir will not be interfered with. When the gasolene level in the pumping reservoir rises to the desired maximum level, the float 14 will close the valve 19 thus cutting off the suction. The gasolene will then flow by gravity through pipe 31 to the carbureter float chamber 7, the gasolene in the lift pipe 21 will flow back to the reservoir and the stand pipe 24 then being empty air will flow freely through into the pumping reservoir, thus maintaining atmospheric pressure in the latter as the gasolene flows out.

The gasolene from the pumping reservoir will continue to flow through the pipe 31 into the carbureter float chamber 7 until it reaches the level where the float 34 will positively close the valve 30.

As the gasolene in the carbureter float chamber is used up the float 34 will fall and the valve 30 will be free to open when the pumping reservoir has been again filled and the suction has been cut off from it by the valve 19 as previously described.

I claim:

1. In a carbureter of the class described, a passage for air, a fuel jet therein, a float chamber adapted to supply liquid fuel to said jet, a passage for supplying fuel under pressure to said float chamber, a valve for closing said passage, a float within said chamber and a one-way connection between said float and said valve for closing the valve to cut off the supply of liquid fuel when the supply within the float chamber reaches a predetermined level while permitting downward motion of said float without opening said valve, upon fall of the level of the liquid in said float chamber.

2. In a carbureter of the class described, a passage for air, a fuel jet therein, a float chamber adapted to supply liquid fuel to said jet, a passage for supplying fuel to said float chamber, by alternating pressure and suction impulses, a valve for closing said passage, a float within said chamber and a one-way connection between said float and said valve for positively closing the valve to cut off the supply of liquid fuel when the supply within the float chamber reaches a predetermined level and to permit downward movement of said float without opening said valve upon fall of the level of the liquid in said float chamber.

3. In a carbureter of the class described, a passage for air, a fuel jet therein, a float chamber adapted to supply liquid fuel to said jet, a passage for supplying fuel, said means comprising a high level vacuum reservoir, a low level tank, and means for applying suction to said reservoir to suck up fuel from the low level tank and to cut off the suction, vent the reservoir and permit gravity flow of the liquid fuel from the reservoir to the carbureter float chamber, a valve for closing said passage, a float within said chamber and a one-way connection between said float and said valve for closing the valve to cut off the supply of liquid fuel when the supply within the float chamber reaches a predetermined level while permitting downward motion of said float without opening said valve, upon fall of the level of the liquid in said float chamber.

4. In a liquid feed system for an internal combustion engine, the combination of a liquid tank, a liquid reservoir above said tank, a communication between the tank and reservoir, a carbureter, means to exhaust said reservoir by the suction which is applied to the carbureter, means to feed liquid from the reservoir to the carbureter, a valve in the carbureter actuated by suction for closing said means, and a float for positively closing said valve independently of the suction.

5. In a liquid feed system for an internal combustion engine, the combination of a liquid tank, a liquid reservoir above said tank, a communication between the tank and reservoir, a carbureter, means to exhaust said reservoir by suction which is applied to the carbureter, means to feed liquid from the reservoir to the carbureter and float controlled means adapted to engage said valve and positively close the same when the float is in the upper position and to permit automatic independent opening and closing of said valve when the float falls.

Signed at New York city in the county of New York, and State of New York, this 7th day of July, A. D. 1917.

CHARLES LAWRENCE STOKES.